US012647608B2

(12) United States Patent
Chen

(10) Patent No.: US 12,647,608 B2
(45) Date of Patent: Jun. 2, 2026

(54) SYSTEMS AND METHODS FOR FAST RESOLUTION RECOVERY IN MIXED-RESOLUTION HESP STREAMS

(71) Applicant: Adeia Guides Inc., San Jose, CA (US)

(72) Inventor: Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 30 days.

(21) Appl. No.: 18/795,341

(22) Filed: Aug. 6, 2024

(65) Prior Publication Data

US 2026/0046446 A1 Feb. 12, 2026

(51) Int. Cl.
  *H04N 19/59* (2014.01)
  *H04N 19/172* (2014.01)
(52) U.S. Cl.
  CPC ........... *H04N 19/59* (2014.11); *H04N 19/172* (2014.11)
(58) Field of Classification Search
  None
  See application file for complete search history.

(56) References Cited

U.S. PATENT DOCUMENTS

| | | | | |
|---|---|---|---|---|
| 2023/0262274 A1* | 8/2023 | Ahn | ........................ | H04N 7/181 |
| | | | | 375/240.16 |
| 2024/0179202 A1* | 5/2024 | Biatek | ..................... | H04L 65/75 |
| 2025/0039496 A1* | 1/2025 | Chen | .................... | H04N 19/114 |

OTHER PUBLICATIONS

Mareen, et al., "Keyframe Insertion for Random Access and Packet-Loss Repair in H.264/AVC, H.265/HEVC, and H.266/VVC", 2022 Data Compression Conference (DCC) (2022).
Speelmans, "HESP-High Efficiency Streaming Protocol", Internet Engineerig Task Force, available online at: <https://datatracker.ietf.org/doc/html.draft-theo-hesp-01> (2021).
Wallendael , et al., "Keyframe Insertion: Enabling Low-Latency Random Access and Packet Loss Repair", Electronics, 10(6):1-17 (2021).
Wallendael, et al., "Mixed-Resolution HESP for More Efficient Fast Channel Switching and Packet-Loss Repair", 2022 Picture Coding Symposium (PCS), 5 pages (2022).

* cited by examiner

*Primary Examiner* — Stuart D Bennett
(74) *Attorney, Agent, or Firm* — HG LAW LLP

(57) ABSTRACT

A source video is encoded in a streaming protocol comprising a normal stream and a companion stream. The normal stream contains I-frames and predicted frames at high resolution. The companion stream contains frames at a lower resolution. When needed, an I-frame from the companion stream may be decoded and upscaled from the second resolution to the first resolution and injected into a decoded picture buffer. At an interval corresponding to an amount of time that is shorter than an interval between I-frames in the normal stream, a first frame is downscaled to the second resolution and then upscaled again to the first resolution. The next frame is then encoded with reference to the upscaled frame such that an output stream recovers to the first resolution based on the second frame prior to receipt of the next I-frame in the normal stream.

18 Claims, 7 Drawing Sheets

600

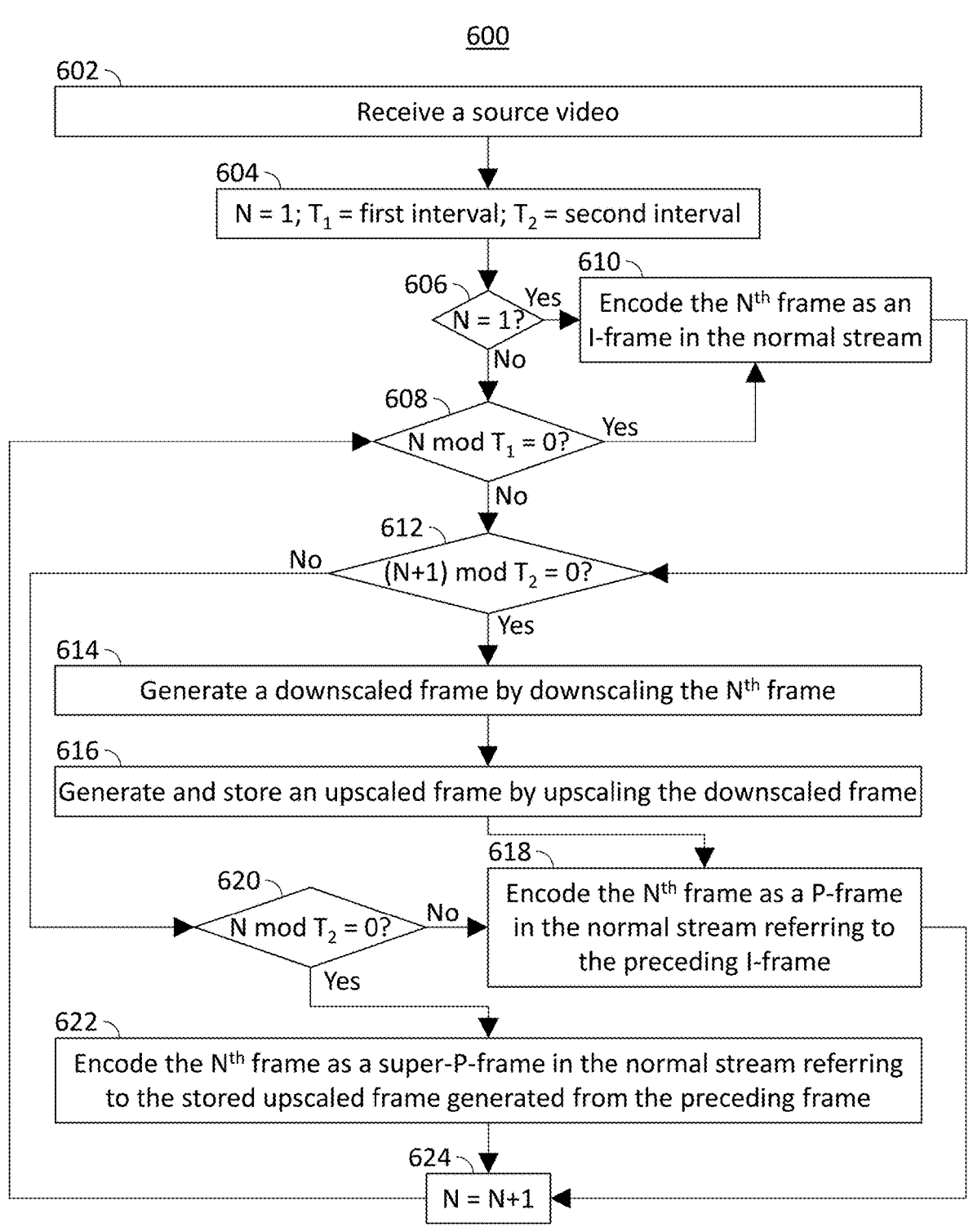

602 — Receive a source video

604 — $N = 1$; $T_1$ = first interval; $T_2$ = second interval

606 — $N = 1$?

Yes → 610 — Encode the $N^{th}$ frame as an I-frame in the normal stream

No

608 — $N \bmod T_1 = 0$?

Yes → (to 610)

No

612 — $(N+1) \bmod T_2 = 0$?

No

Yes

614 — Generate a downscaled frame by downscaling the $N^{th}$ frame

616 — Generate and store an upscaled frame by upscaling the downscaled frame

620 — $N \bmod T_2 = 0$?

No → 618 — Encode the $N^{th}$ frame as a P-frame in the normal stream referring to the preceding I-frame Yes 622 — Encode the $N^{th}$ frame as a super-P-frame in the normal stream referring to the stored upscaled frame generated from the preceding frame

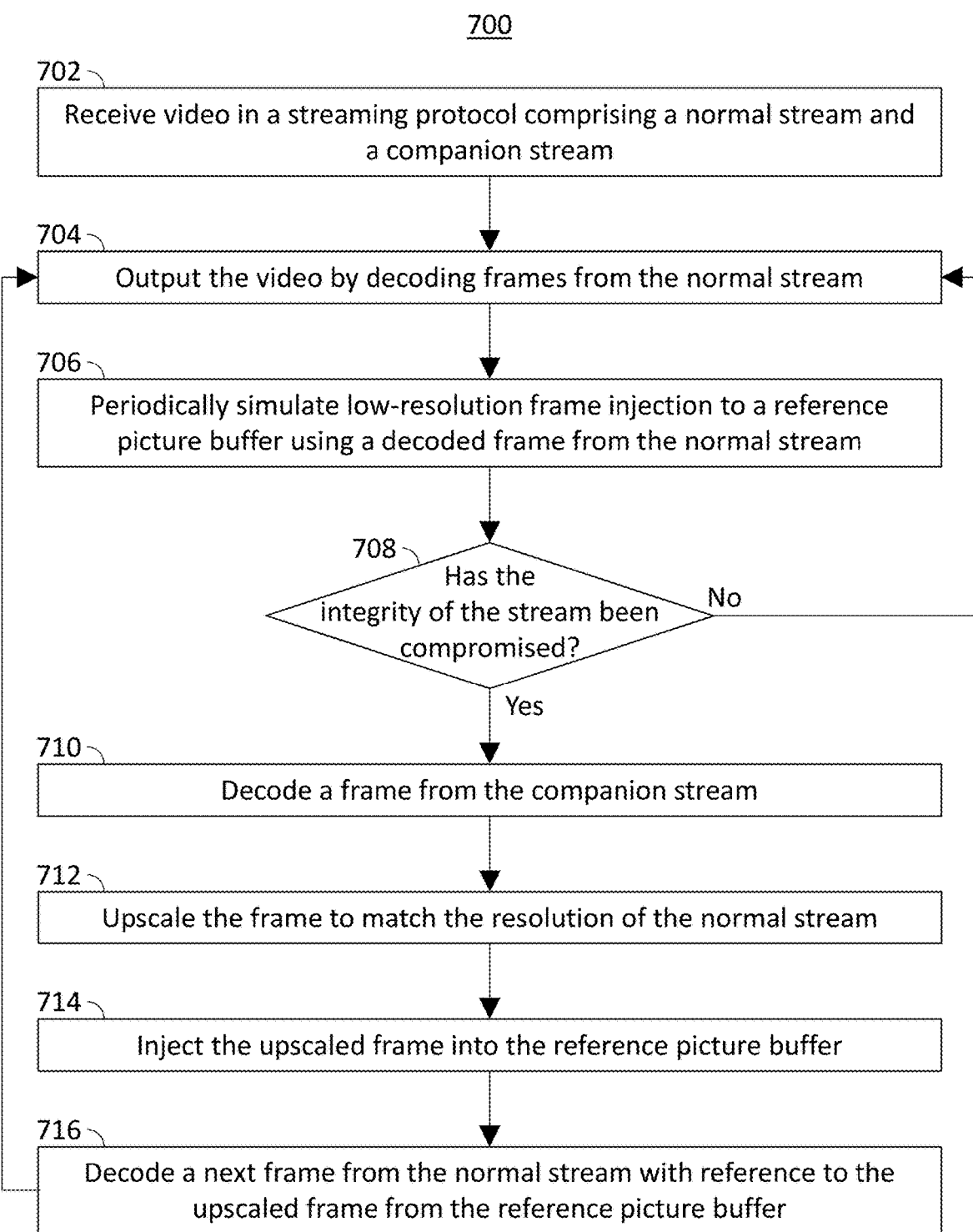

700

702
Receive video in a streaming protocol comprising a normal stream and a companion stream 704
Output the video by decoding frames from the normal stream 706
Periodically simulate low-resolution frame injection to a reference picture buffer using a decoded frame from the normal stream 708
Has the integrity of the stream been compromised?

No

Yes

710
Decode a frame from the companion stream

712
Upscale the frame to match the resolution of the normal stream

714
Inject the upscaled frame into the reference picture buffer

716
Decode a next frame from the normal stream with reference to the upscaled frame from the reference picture buffer

FIG. 7

SYSTEMS AND METHODS FOR FAST RESOLUTION RECOVERY IN MIXED-RESOLUTION HESP STREAMS

BACKGROUND

This disclosure relates to streaming media resolution. In particular, solutions for fast resolution recovery in mixed resolution High Efficiency Stream Protocol (HESP) streams are provided.

SUMMARY

Mixed-resolution HESP was designed to use a single companion stream to service all available normal streams. The companion stream contains intra frames (I-frames) at a reduced resolution compared to the resolution of the available normal streams. This reduced resolution of the I-frames in the companion stream reduces bitrate spikes in the downloaded stream, e.g., at a switch of channel or bitrate. However, a significant drawback has been acknowledged and demonstrated. Due to the low resolution of the I-frames in the companion stream, injection of an I-frame from the companion stream results in a loss of detail that cannot be recovered in the decoding of subsequent predicted frames (P-frames).

Video streaming service providers invest significant efforts to increase the viewer-friendliness of live streaming. For example, video content is typically encoded at multiple resolutions and quality levels in an adaptive bitrate (ABR) ladder. However, it has always been a challenge to provide low-latency channel switching (i.e., random access) and packet-loss repair. This is largely due to the fact that key frames that can be decoded without reference to previous frames (i.e., I-frames) typically occur infrequently (e.g., every couple of seconds). In practice, this frequency is set by the GOP (group of pictures) size of the stream. It is highly desirable to have a large GOP size for better compression efficiency. On the other hand, smaller GOP sizes allow for faster random access and recovery from packet-loss.

HESP utilizes key frame injection or key frame insertion, combining the advantages of both a long GOP and a short GOP. A compression-efficient normal stream (NS) that uses a long GOP size is accompanied by a companion stream (CS) that only consists of key frames (i.e., a very short GOP size). During streaming, clients receive the normal stream by default. In the case that a channel change occurs, or a packet loss is encountered, the next occurring key frame from the companion stream is transmitted. This key frame substitutes the corresponding frame in the normal stream. HESP was initially proposed for low-latency HTTP adaptive streaming, and it has already been tested in low-latency multicast streaming. The solution is also applicable to IPTV and content delivery to set-top boxes.

This disclosure proposes solutions to improve the performance of mixed-resolution HESP through quick recovery of picture resolution after injecting a low-resolution key frame from the companion stream. The systems and methods described herein consider the balance between avoiding the bitrate increase in the downloaded stream and the quick recovery to the high resolution without waiting for the next key frame in the normal stream. The key module is built around reference picture resampling (RPR) and its simulation. In the normal stream, the display of a decoded reference picture is at its intended resolution after decoding. This eliminates quality changes when decoding the normal stream. After decoding, a reference used for inter-prediction is resampled to simulate a reduced resolution reference, in anticipation of possible key frame injection from the companion stream. This in-loop filtering or processing is separately signaled for decoding the downloaded stream.

The RPR process used herein differs from conventional RPR. Conventional RPR assumes the reference is encoded and decoded at a different resolution, where decoding the normal stream will show a reduced resolution at such frames. In the RPR process used in this disclosure, however, the reference picture is encoded at a same resolution so that it can be displayed in its original resolution. This ensures the decoding of the normal stream does not vary or compromise the picture resolution. For decoding the next frame, the reference frame is simulated through RPR for the purpose of quickly recovering to its original resolution in the case of low-resolution key frame injection. When this type of RPR simulation is enabled for every frame, it can achieve the fastest recovery to the high resolution with a latency of only a single frame.

Systems and methods are described herein for fast resolution recovery of a video stream. A source video is received from a media source, such as a live broadcast feed. The source video is encoded in a video streaming protocol comprising a normal stream and a companion stream. The normal stream contains I-frames and predicted frames at a first resolution and the companion stream contains frames at a second resolution lower than the first resolution. I-frames in the normal stream are encoded at a first interval corresponding to a first amount of time. I-frames from the companion stream may be decoded and upscaled from the second resolution to the first resolution and injected into a decoded picture buffer by a decoder if needed. At a second interval corresponding to a second amount of time that is shorter than the first amount of time, a downscaled frame is generated by downscaling a first frame from the first resolution to the second resolution. The downscaled frame is then upscaled again to generate a frame at the first resolution. A second frame immediately following the first frame in the encoding order is then encoded with reference to the upscaled frame such that, after injection of an upscaled I-frame from the companion stream, an output stream recovers to the first resolution based on the second frame prior to receipt of the next I-frame in the normal stream.

To illustrate, in example operation, a normal stream may have I-frames at a first desired interval (e.g., every 300 frames). At a second desired interval (e.g., every 30 frames), "super" P- or B-frames (described in more detail below) may be inserted into the normal stream rather than "normal" P- and B-frames. To create the "super" P- and B-frames, a frame from the normal stream (e.g., the "first frame" mentioned above) is decoded, downscaled, and then upscaled to create a reference frame (e.g., the "upscaled frame" mentioned above). Then, the "super" P- or B-frame (e.g., the "second frame" mentioned above) is encoded with reference to the reference/upscaled frame and included in the normal stream immediately following the first frame. Since the upscaled frame contains less information than its high-resolution counterpart (i.e., the first frame) otherwise would, the encoding of the second frame (sometimes called a "super frame," a "super predicted frame," etc.) includes more information to represent the difference, or delta, between the high-resolution version of the second frame and the down-scaled/upscaled frame than it would need to include to represent the delta between the high-resolution version of the second frame and the high-resolution version of the first frame.

In some cases, "super" P- and B-frames may exist at the same interval in the normal stream as an interval of I-frames in the companion stream. In other cases, the "super" P- and B-frames may exist at a different interval (e.g., to reduce bandwidth requirements). For example, in may be the case that a "super" P- or B-frame exists for every five frames in the companion stream. In some instances, a low-resolution I-frame in the companion stream exists for every single frame in the normal stream, and a "super" P- or B-frame is inserted every 30 frames, for example.

In any event, as a result, when a low-resolution frame from the companion stream is upscaled and injected in place of the first frame (or another frame prior to the first frame), the output stream can recover to a high-resolution picture at the second frame because the second frame (e.g., the "super" frame) was encoded utilizing an upscaled low-resolution frame equivalent to that found in the companion stream. In other words, after an injection from the low-resolution companion stream into the output stream, the output stream can recover as soon as (i) a next high-resolution I-frame in the normal stream is reached; or (ii) a next "super" frame in the normal stream is reached (note, in some embodiments, not every I-frame in the companion stream will have a corresponding "super" frame in the normal stream). Thus, there is no need to wait longer than the second interval (e.g., 1 second or 30 frames) to recover. By comparison, in traditional approaches, the stream might otherwise need to wait for a maximum of the first interval for recovery (e.g., 10 seconds or 300 frames). Alternatively, on the decoding side, when keyframe injection does not occur, the decoder simply downscales and upscales the first frame to enable decoding of the second frame.

To illustrate further, a normal stream may have frames 0-100. Frames 0 and 100 may be high-resolution I-frames. Frames 1-99 may all be P- or B-frames. Frames 10, 20, 30, etc. may be frames for which a reference frame was created for the purpose of encoding "super" frames. As such, frames 11, 21, 31, etc. may be "super" frames. During the decoding process, frame 1 may be replaced by way of injecting a low-resolution I-frame from the companion stream at frame 1. Frames 2-10 may reference this low-resolution injected frame and, thus, may also result in low-resolution pictures when decoded and presented. However, at frame 11, a high-resolution recovery is made by decoding the super-P-frame at frame 11 to obtain a high-resolution image. This is possible because super-P-frame 11 was encoded referencing a low-resolution image that corresponds to the low-resolution image of frame 10 or any of the previous frames 2-9. Since the encoded super-P-frame 11 carries more information than other P-frames, this enables the output stream to recover at frame 11 rather than at frame 100 where the next high-quality I-frame exists.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 6 is a flowchart representing an illustrative process for encoding a mixed-resolution HESP stream to enable fast resolution recovers, in accordance with some embodiments of the disclosure; and FIG. 7 is a flowchart representing an illustrative process for decoding a mixed-resolution HESP stream to enable fast resolution recovery, in accordance with some embodiments of the disclosure.

DETAILED DESCRIPTION

Figure 1:
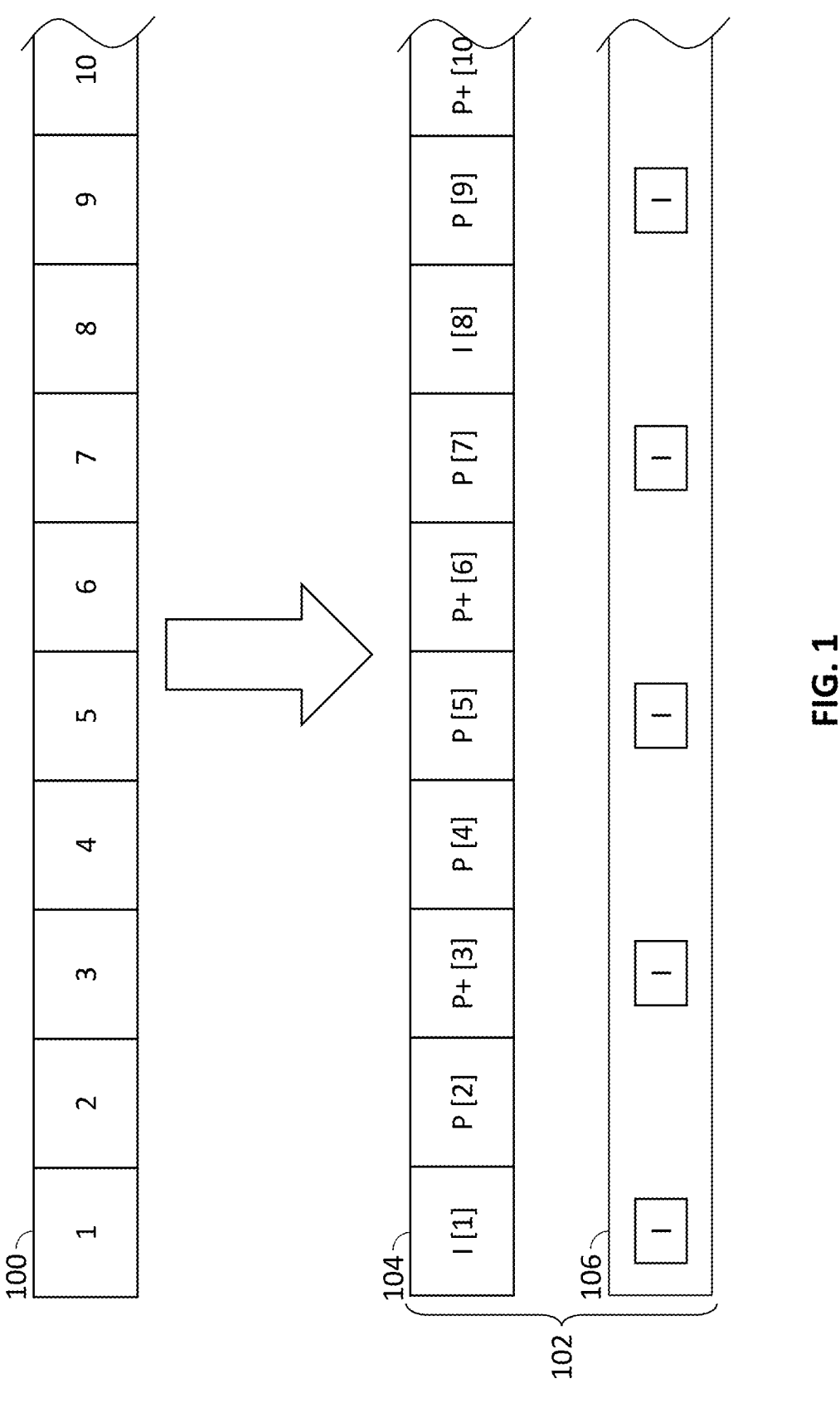
FIG. 1 depicts an illustrative example of mixed-resolution HESP encoding of a video stream, in accordance with some embodiments of the disclosure.

HESP uses long GOPs in the normal stream so that compression efficiency can be maximized. At the same time, the very short GOPs in the companion stream allow for fast channel switching since a keyframe or I-frame is accessible at any time. In the regular HESP operation, an I-frame of the same resolution as the normal stream is injected from the companion stream, which introduces a bitrate spike. HESP also uses a separate companion stream for each bitrate across the ABR ladder. It therefore has a high production complexity and distribution cost. The impact of the HESP key frame injection on the video quality has been proven to be very low or even negligible.

Mixed-resolution HESP was designed to use a single companion stream to service all the normal streams. Reducing the resolution of the I-frames in the companion stream reduces the bitrate spikes. However, there is a significant drawback with regard to resolution. Due to the low resolution of the injected key frame form the companion stream, the loss of detail is not recovered in the subsequent P-frames. In other words, if the normal stream is encoded at a high resolution, the insertion of a low-resolution key frame will cause the subsequent prediction frames that directly or indirectly reference the replaced frame to be in a low resolution and/or exhibit visual artifacts when displayed until the next I-frame in the normal stream is decoded. In other words, the stream does not recover to a high picture quality until the next I-frame in the normal stream is decoded and presented.

Since the design of HESP leverages the use of long GOPs in the normal stream, the next I-frame can be a few seconds after the injection of a low-resolution key frame from the companion stream. This is equivalent to switching to a low-bitrate or low-quality segment until the next refresh at the key frame of a same resolution. This negative impact is even more significant in the case of static high-quality scenes, where a lot of detail is included, e.g., a streaming session of gaming or streaming of a recorded game.

Solutions are provided in this disclosure to improve the performance of mixed-resolution HESP. For example, some of the disclosed methods enable quick recovery of picture resolution in the case of injecting a low-resolution key frame from the companion stream. These methods consider the balance between avoiding a bitrate increase in the downloaded stream and quick recovery from the low resolution provided by the companion stream and the high resolution of the normal stream without waiting for the next key frame in the normal stream to be received and/or decoded. This may be accomplished by using reference picture resampling (RPR) and simulating RPR in the creation of "super-P-frames" which encode additional information relative to a "normal" prediction frame, with reference to a frame generated by RPR simulation, to approach or achieve a high-resolution image.

In the normal stream, the display of a decoded reference picture is at its intended resolution after decoding. There are, therefore, no quality changes when decoding the normal stream. After decoding, a reference used for inter-prediction is resampled to simulate a reduced resolution reference in anticipation of possible key frame injection from the companion stream. This in-loop filtering or processing is separately signaled for decoding the normal stream.

The RPR process is not used in its conventional way. The conventional RPR assumes the reference is encoded and decoded at a different resolution, where decoding the normal stream will thus show a reduced resolution at such frames. In the methods described in this disclosure, the reference picture is encoded at a same resolution so that it can be displayed in its original resolution. This enables, during the decoding and presentation of the normal stream, avoidance of variation or compromises in the picture resolution. For decoding the next frame, the reference frame is simulated through RPR for the goal of quickly recovering to its original resolution in the case of low-resolution key frame injection. When this RPR simulation is enabled per frame, it can achieve the fastest recovery to the high resolution in a latency of only a single frame. However, even when the simulation is only enabled for one frame for every second of content it achieves a faster recovery to the high resolution due to the long GOPs used in HESP encoding of the normal stream. Indeed, if desired, the methods described herein may not be continuously used (i.e., encoding every P-frame as a super-P-frame) because inter-prediction from a resampled low-resolution reference frame is not as efficient and may lead to an increase in bitrate. Hence, the inclusion of a super-P-frame may be periodic (e.g., once every half-second).

As noted, in some embodiments the described methods can be applied to the streams with bi-directional predicted frames (B-frames) as well. One way to apply these methods is to duplicate the reference frames, if desired, in decoding a B-frame after the insertion of an I-frame from the companion stream. Alternatively, the first B-frames can be skipped until the next P-frame in the normal stream is decoded after the insertion of an I-frame from the companion stream. For clarity of discussion, however, this disclosure will discuss a stream with I- and P-frames only.

FIG. 1 depicts an illustrative example of mixed-resolution HESP encoding of a video stream. Video stream 100 may be a raw video stream, such as a live broadcast. Each frame may be provided in full resolution with all video data included. In other words, every frame of video stream 100 may be considered an I-frame, in that the image depicted by any given frame can be displayed by decoding that frame without reference to any other frame. Video stream 100 is encoded into a mixed-resolution HESP stream 102. Mixed-resolution HESP stream 102 includes normal stream 104, with I-frames encoded at full resolution (e.g., 4K) and both P-frames and super-P-frames encoded at full resolution with reference to an I-frame, and companion stream 106, with I-frames encoded at a reduced resolution (e.g., 720p) but with greater frequency than that of the normal stream. For example, normal stream 104 may be encoded with long GOPs, resulting in one I-frame for every ten seconds of content. Companion stream 106 may be encoded with a low-resolution I-frame for every one second, or even every frame, of content.

Figure 2:
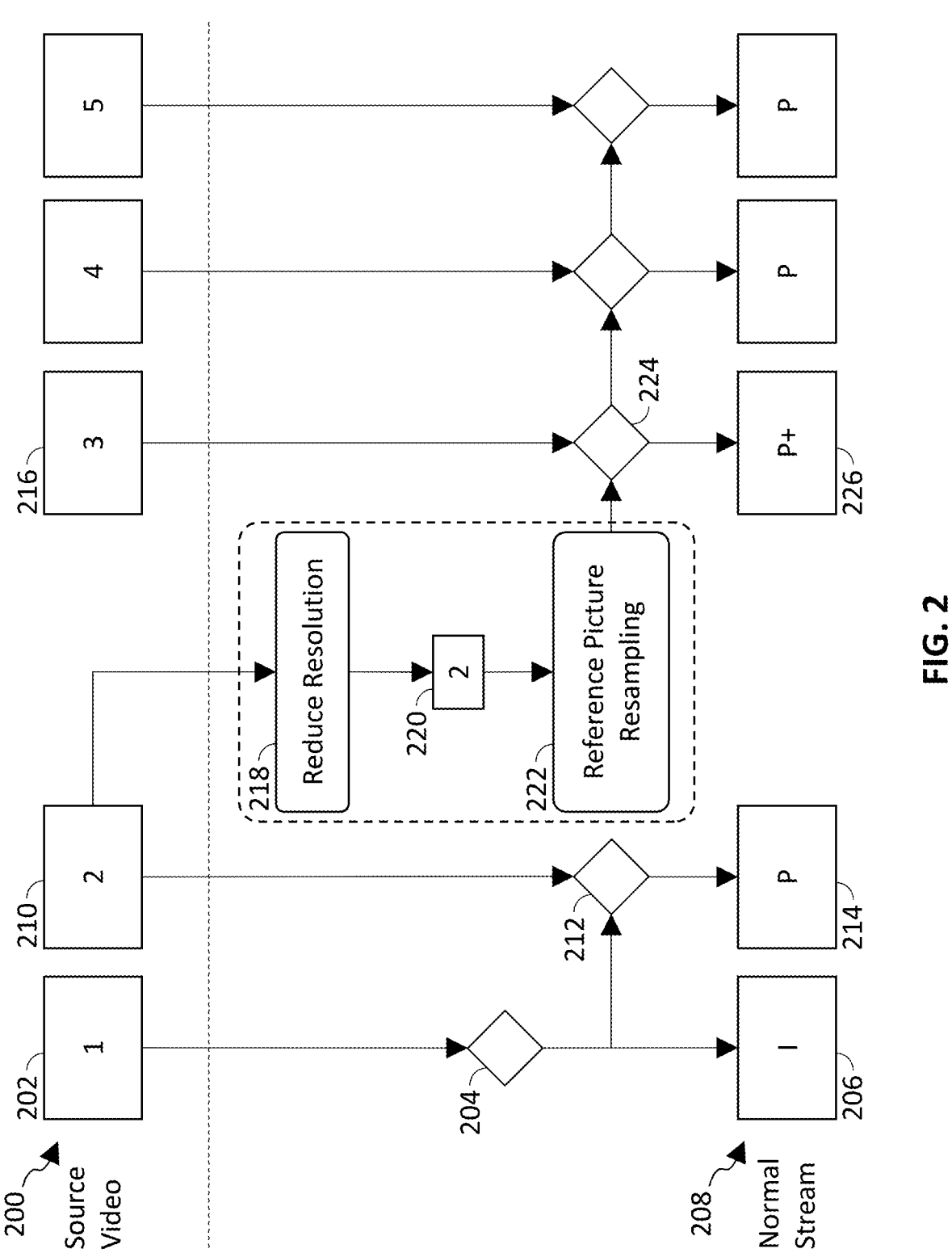
FIG. 2 depicts an illustrative example of encoding a mixed-resolution HESP stream to enable fast resolution recovery, in accordance with some embodiments of the disclosure.

FIG. 2 depicts an illustrative example of encoding a mixed-resolution HESP stream to enable fast resolution recovery, in accordance with some embodiments of the disclosure. Source video 200 is received at an encoder. Frame 202 of source video 200 is encoded 204 as an I-frame in normal stream 208 of the mixed-resolution HESP stream. The next frame of source video 200, frame 210, is then encoded 212 with reference to I-frame 206 as P-frame 214.

Based on the encoder settings, frame 216 of source video 200 is to be encoded as a super-P-frame. Frame 210 of source video 200 is processed to simulate RPR. First, the encoder reduces the resolution (218) of frame 210 to generate a low-resolution version 220 of the frame. Low-resolution frame 220 is then processed by RPR (222) to return it to the full resolution. This is a lossy process that results in a reduction in the level of detail depicted in the upscaled frame. Frame 216 is then encoded 224 with reference to the output of RPR 222. Super-P-frame 226 is thereby encoded with data needed to reconstruct the lost details.

Figure 3:
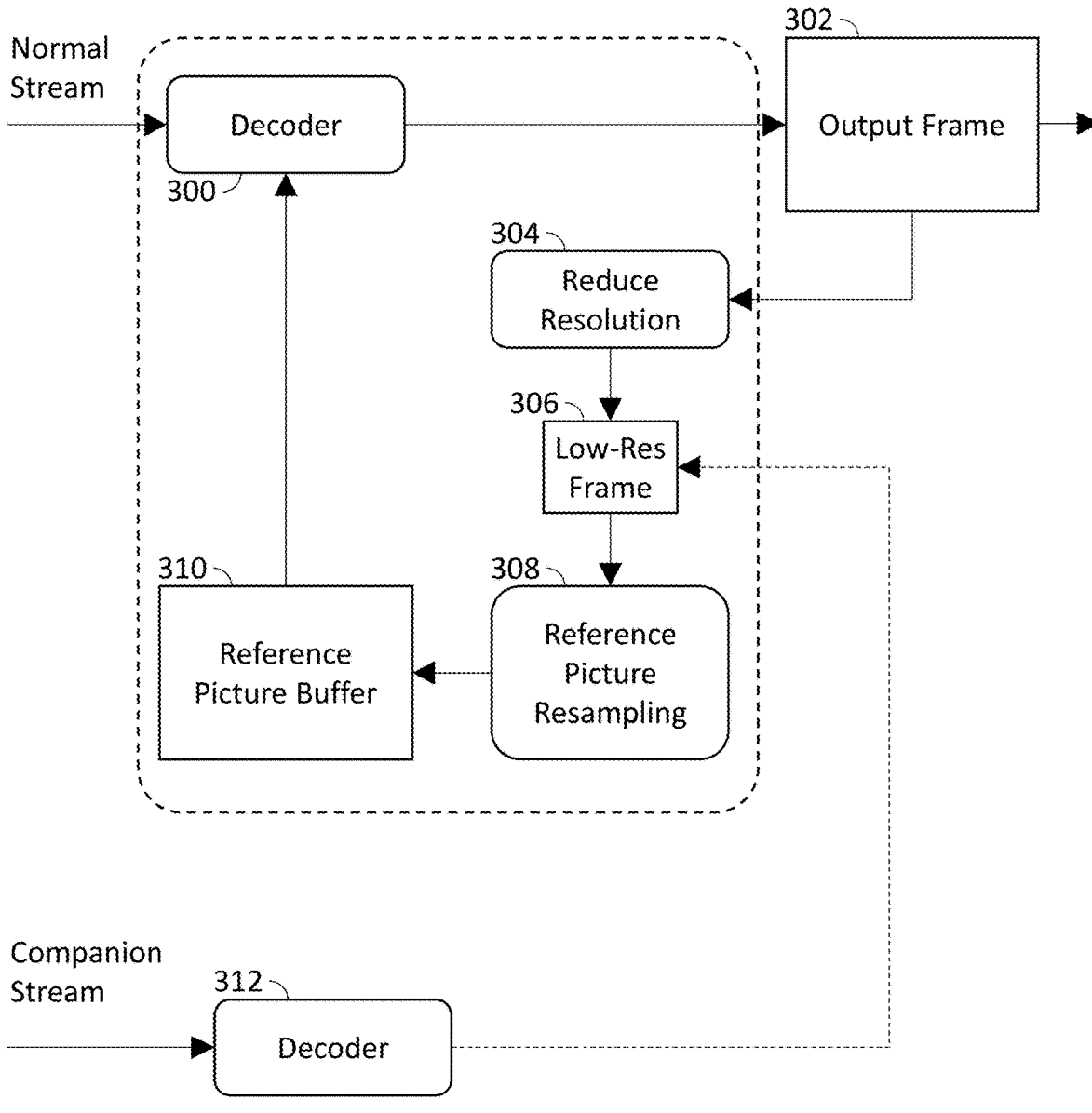
FIG. 3 depicts an illustrative example of decoding a mixed-resolution HESP stream with RPR simulation, in accordance with some embodiments of the disclosure.

FIG. 3 depicts an illustrative example of decoding a mixed-resolution HESP stream with RPR simulation, in accordance with some embodiments of the disclosure. A frame from the normal stream is input into a decoder 300. The frame is decoded and rendered as output frame 302. In addition to being generated for output, output frame 302 is further processed in anticipation of potential injection of a low-resolution frame from the companion stream. The resolution of output frame 302 is reduced at 304 to generate a corresponding low-resolution frame 306. Low resolution frame 306 is then upscaled using RPR 308 to return the frame to its original resolution. The upscaled frame is then stored in reference picture buffer 310. When the next frame P-frame is received, the decoder decodes the P-frame with reference to the upscaled frame stored in reference picture buffer 310. If it becomes desirable to inject a low-resolution frame from the companion stream, the low-resolution frame is decoded 312 and then used in place of the downscaled version of output frame 302. The injected frame is then upscaled using RPR and is stored in reference picture buffer 310. The next frame from the normal stream is then decoded with reference to the upscaled version of the injected frame stored in reference picture buffer 310.

Figure 4:
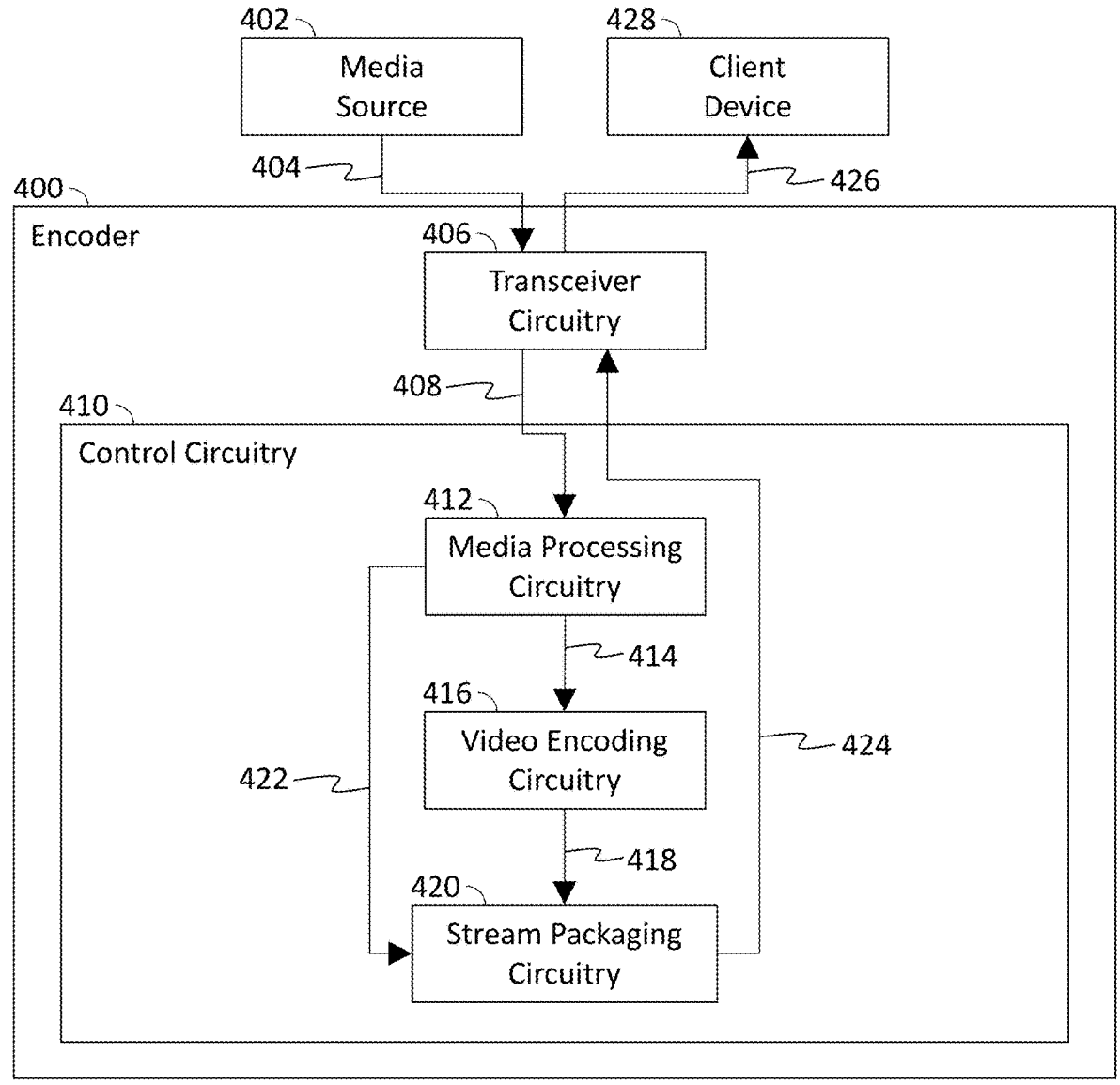
FIG. 4 is a block diagram representing components and data flow therebetween of an illustrative media encoder for encoding a mixed-resolution HESP stream, in accordance with some embodiments of the disclosure.

FIG. 4 is a block diagram representing components and data flow therebetween of an illustrative media encoder 400 for encoding a mixed-resolution HESP stream, in accordance with some embodiments of the disclosure. Media source 402 provides 404 content to encoder 400 to be encoded in a mixed-resolution HESP stream. The content provided by media source 402 may be a raw media stream or a media stream encoded in any suitable streaming format. In some embodiments, media source 402 is a live media source, such as a live broadcast of a sporting event.

Encoder 400 receives the content using transceiver circuitry 406. Transceiver circuitry 406 may comprise a data bus connection or physical data connection port (e.g., USB).

Transceiver circuitry 406 may also comprise a network connection over which data ban be transmitted to an received from remote devices, such as an Ethernet connection, Wi-Fi connection, mobile broadband interface, or connection employing any other suitable network protocol. Transceiver circuitry 406 in turn transmits 408 the received content to control circuitry 410, where it is received using media processing circuitry 412.

Control circuitry 410 may be based on any suitable processing circuitry and comprises control circuitry and memory circuitry, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Media processing circuitry 412 processes the received content for encoding into a mixed-resolution HESP stream. Media processing circuitry 412 separates video data from audio data. Media processing circuitry 412 decodes each frame of video data into a format from which the HESP stream can be encoded. For example, encoder 400 may be configured to encode raw video into the HESP stream while the content is received in an H.264 stream. Media processing circuitry 412 may decode each frame of video from the H.264 stream to generate full resolution video frames that do not rely on prediction from other frames (i.e., I-frames). The decoded video frames are transmitted 414 to video encoding circuitry 416.

Video encoding circuitry 416 encodes each frame of video into either an I-frame, a P-frame, or a super-P-frame, as determined by the settings of the encoder. The settings of the encoder may include a first time interval for I-frames and a second time interval for super-P-frames. For example, the encoder may be configured to include an I-frame in the normal stream every ten seconds. For a 30 fps video, this results in an I-frame spacing of 300 frames. The encoder may be further configured to include a super-P-frame every half-second, resulting in a spacing of 15 frames. The encoder may also be configured to include a low-resolution I-frame in the companion stream every second, resulting in a spacing of 30 frames.

High-resolution I-frames and P-frames may be encoded using any known techniques. For example, if the content is provided as a raw video, each frame may be converted to a specific color space (e.g., YUV). The frame may be processed for spatial transformation, segmenting the frame into blocks or macroblocks. Each block or macroblock of the frame may then be transformed using direct cosine transfer (DCT). The DCT converts spatial domain data into frequency domain data, which helps in concentrating energy of the signal in fewer coefficients, enabling efficient compression. After transformation, quantization may be applied to the DCT coefficients. Quantization reduces the precision of the coefficients by dividing them by a quantization step size. This removes high-frequency components that are less perceptually significant. The quantized coefficients are then entropy encoded using techniques such as Huffman coding or arithmetic coding. Entropy encoding assigns shorter codes to more frequently occurring data patterns, thereby reducing the overall bit rate of the encoded frame. Low-resolution I-frames may be generated for the companion stream by downsampling or otherwise reducing the resolution of a video frame to a lower resolution. For example, the content may be provided in 4K resolution, the normal stream may also be encoded at 4K resolution, and the companion stream may be encoded in 720p resolution. This reduction of resolution may be accomplished using any suitable methods.

At a set interval, video encoding circuitry 416 may perform an RPR simulation for a frame. Video encoding circuitry 416 reduces the resolution of the frame to the lower resolution of the companion stream. Video encoding circuitry 416 then upscales the lower resolution version of the frame back to the original resolution. This simulates the injection of an I-frame from the companion stream at a client device during playback of the HESP stream. Video encoding circuitry 416 stored the upscaled frame in a reference picture buffer. Video encoding circuitry 416 then encodes the following frame with reference to the upscaled frame, rather than the preceding I-frame. Video encoding circuitry 416 then transmits 418 any generated I-frames, P-frames, super-P-frames, and/or low-resolution I-frames to stream packaging circuitry 420. Media processing circuitry 412 may also transmit 422 audio data from the content provided by media source 400 to stream packaging circuitry 420. Stream packaging circuitry 420 constructs a mixed-resolution HESP stream from these inputs. The stream is transmitted 424 to transceiver circuitry 406, which in turn transmits 426 the stream to, for example, client device 428.

Figure 5:
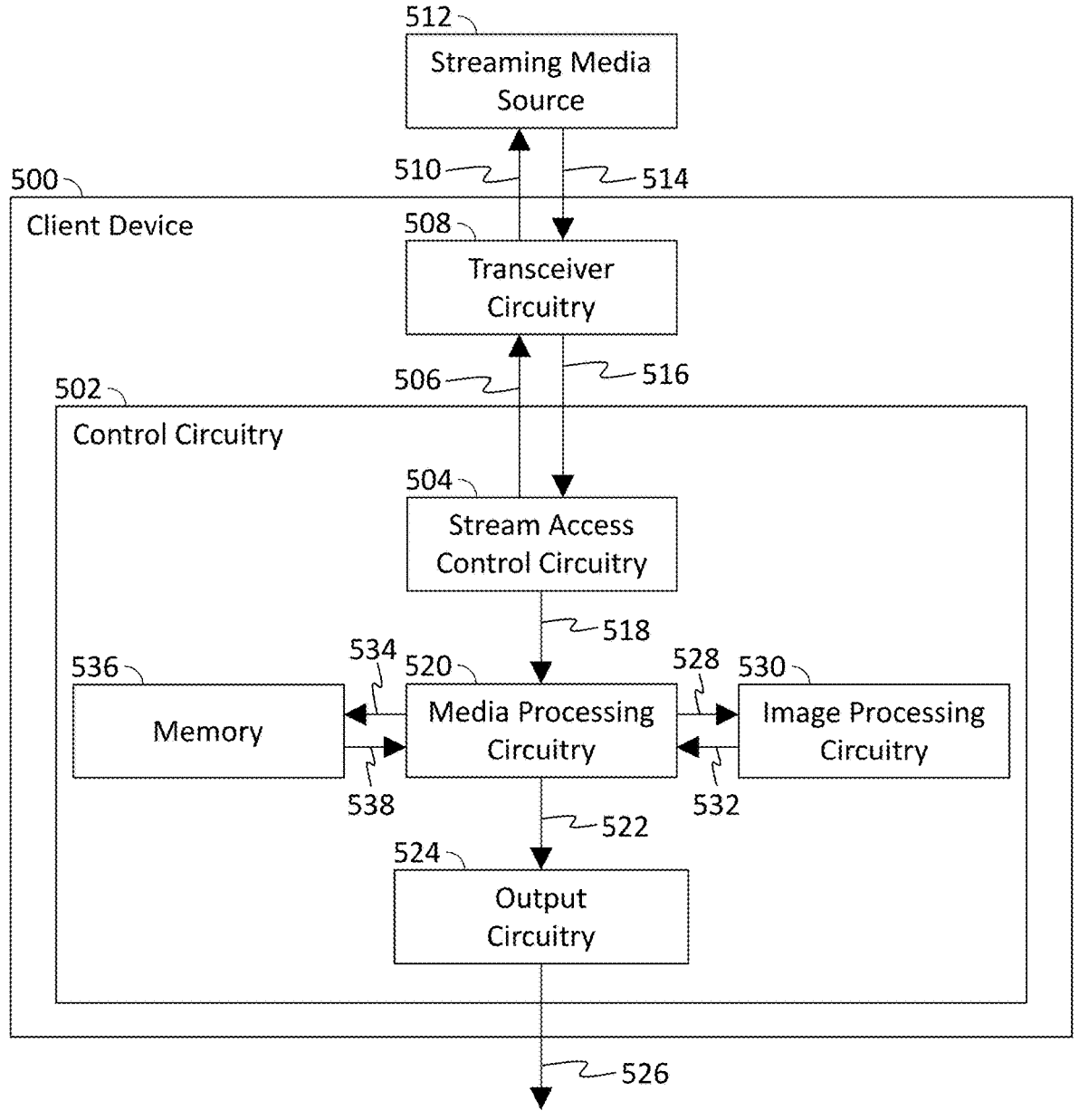
FIG. 5 is a block diagram representing components and data flow therebetween of an illustrative client device configured to decode a mixed-resolution HESP stream, in accordance with some embodiments of the disclosure.

FIG. 5 is a block diagram representing components and data flow therebetween of an illustrative client device 500 configured to decode a mixed-resolution HESP stream, in accordance with some embodiments of the disclosure. Control circuitry 502 of client device 500 accesses a media stream using stream access control circuitry 504. Control circuitry 502 may be based on any suitable processing circuitry and comprises control circuitry and memory circuitry, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Stream access control circuitry 504 controls access to one or more media streams. For example, stream access control circuitry 504 initiates a request to access a specific media stream. The request is transmitted 506 to transceiver circuitry 508. Transceiver circuitry 508 may comprise a data bus connection or physical data connection port (e.g., USB). Transceiver circuitry 508 may also comprise a network connection over which data ban be transmitted to an received from remote devices, such as an Ethernet connection, Wi-Fi connection, mobile broadband interface, or connection employing any other suitable network protocol. Transceiver circuitry 508 transmits 510 the request to streaming media source 512. Streaming media source 512 may be a content server or an edge server that hosts the requested stream. In some embodiments, streaming media source 512 may be an encoder, such as encoder 400.

Streaming media source 512 verifies the identity of client device 500 or a user of client device 500 attempting to access the stream. This may be accomplished through authentication mechanisms such as username-password authentication, OAuth tokens, API keys, or other forms of credentials. Upon successful authentication, streaming media source 512 checks if the authenticated entity (i.e., client device 500 or a user of client device 500) is authorized to access the requested media stream. Authorization can be based on various factors such as subscription status, geographic location, user permissions, or any other factor. If authentication and authorization are successful, streaming media source 512 establishes a session with client device 500, allowing for the continuous transmission of data (i.e., the media stream) during the session. Once the session is established, streaming media source 512 begins transmitting 514 the media stream data to client device 500. Client device 500 receives the media stream using transceiver circuitry 508, which in turn transmits 516 the media stream to stream access control circuitry 504. This may be done to maintain the session between client device 500 and streaming media source 512.

Stream access control circuitry 504 transmits 518 the received media stream to media processing circuitry 520. Media processing circuitry 520 decodes the media stream for output. Under normal operating conditions, media processing circuitry 520 decodes frames from the normal stream only. The decoded frames, along with associated audio data, are transmitted 522 to output circuitry 524 for output 526 to a user. Output circuitry 524 may include video drivers and/or audio drivers for controlling output devices such as screens, speakers, volumetric displays, etc.

There are circumstances in which media processing circuitry 520 may instead decode and inject into the stream a frame from the companion stream. For example, upon joining a stream, the first frame received from streaming media source 512 may not be an I-frame and media processing circuitry 520 may have no reference picture from which to generate an image with only data included in a P-frame. Other examples may include packet loss and stream switching due to changes in available bandwidth or other network conditions. In these situations, media processing circuitry 520 decodes the first available low-resolution I-frame from the companion stream. The decoded low-resolution I-frame is transmitted 528 to image processing circuitry 530. Image processing circuitry 530 upscales the low-resolution I-frame using RPR and transmits 532 the upscaled version of the frame to media processing circuitry 520. Media processing circuitry 520 then uses the upscaled frame as a reference for decoding subsequent P-frames until a new I-frame is received in the normal stream. Media processing circuitry 520 may transmit 534 the upscaled version of the frame to memory 536 to be stored in a reference picture buffer. Memory 536 may be any suitable electronic storage device such as random-access memory, read-only memory, hard drives, optical drives, solid state drives, quantum storage devices, or any other suitable fixed or removeable storage devices, and/or any combination of the same. The stored upscaled frame may be retrieved 538 by media processing circuitry 520 as needed.

FIG. 6 is a flowchart representing an illustrative process 600 for encoding a mixed-resolution HESP stream to enable fast resolution recovers, in accordance with some embodiments of the disclosure. Process 600 may be implemented on control circuitry 410. In addition, one or more actions of process 600 may be incorporated into or combined with one or more actions of any other process or embodiments described herein.

At 602, control circuitry 410 receives a source video. For example, control circuitry 410 may receive a raw video stream of a live broadcast event, such as a sporting event.

At 604, control circuitry 410 initializes a counter variable N, setting its initial value to one. Control circuitry 410 also retrieves, from settings of the encoder, a first interval $T_1$ representing the frame interval at which an I-frame is to be inserted into the normal stream and a second interval $T_2$ representing the frame interval at which a super-P-frame is to be inserted into the normal stream. For example, if the encoder is set to generate a 30 fps normal stream with an I-frame every ten seconds, $T_1$ may have a value of 300. $T_2$ will have a value smaller than that of $T_1$ such that super-P-frames are included in the normal stream more frequently than I-frames are included in the normal stream. $T_2$ may, for example, have a value of 15 such that a super-P-frame is included in the companion stream every half-second.

At 606, control circuitry 410 determines whether N is equal to one, meaning that the current frame being encoded is the first frame of the content. If N is not equal to one ("No" at 606), then, at 608, control circuitry 410 determines whether $N \bmod T_1$ is equal to zero, meaning that N is an integer multiple of $T_1$. For example, if $T_1$ is equal to 300 then $N \bmod T_1$ will equal zero when N is equal to 300, 600, 900, etc. If N is a multiple of $T_1$ ("Yes" at 608) or N is equal to one ("Yes" at 606), then, at 610, control circuitry 410 encodes the $N^{th}$ frame as an I-frame.

If N is not a multiple of $T_1$ ("No" at 608), or after encoding the $N^{th}$ frame as an I-frame in the normal stream, at 612, control circuitry 410 determines whether $(N+1) \bmod T_2$ is equal to zero, meaning that (N+1) is an integer multiple of $T_2$ and, therefore, that the following frame (i.e., the $(N+1)^{th}$ frame) should be encoded as a super-P-frame. If so ("Yes" at 612), then, at 614, control circuitry 410 generates a downscaled frame by downscaling the $N^{th}$ frame. For example, control circuitry 410 may use nearest neighbor, bilinear interpolation, or bicubic interpolation, or any other suitable method to downscale the $N^{th}$ frame to a lower resolution.

At 616, control circuitry 410 generates an upscaled frame by upscaling the downscaled frame. Methods similar to those used in downscaling the $N^{th}$ frame may also be used to upscale the downscaled version of the $N^{th}$ frame back to its original resolution. Control circuitry 410 then stores the upscaled frame in a reference picture buffer.

At 618, control circuitry 410 encodes the $N^{th}$ frame as a P-frame referring to the preceding frame. This may be accomplished using any suitable encoding techniques.

If N is not an integer multiple of $T_2$, ("No" at 612), then, at 620, control circuitry 410 determines whether $N \bmod T_2$ is equal to zero, meaning that the current frame should be encoded as a super-P-frame. If so ("Yes" at 620), then, at 622, control circuitry 410 encodes the $N^{th}$ frame as a super-P-frame. To do so, control circuitry 410 retrieves the stored upscaled frame from the reference picture buffer. Control circuitry 410 then determines motion vectors and other image data needed to reproduce the $N^{th}$ frame in as much detail as possible based on the upscaled frame. Control circuitry 410 then encodes this data as a super-P-frame in the normal stream.

After encoding the $N^{th}$ frame as either a P-frame (at 618) or a super-P-frame (at 622), at 624, control circuitry 410 increments the value of N by one. Processing then returns to 608. Process 600 continues until the source video ends. For example, control circuitry 410 may receive an end-of-stream message from the media source, thereby triggering an end to process 600.

The actions and descriptions of FIG. 6 may be used in any other embodiment of this disclosure. In addition, the actions and descriptions described in relation to FIG. 6 may be done in suitable alternative orders or in parallel to further the purposes of this disclosure.

FIG. 7 is a flowchart representing an illustrative process 700 for decoding a mixed-resolution HESP stream to enable fast resolution recovery, in accordance with some embodiments of the disclosure. Process 700 may be implemented on control circuitry 502. In addition, one or more actions of process 700 may be incorporated into or combined with one or more actions of any other process or embodiments described herein.

At 702, control circuitry 502 receives video in a streaming protocol comprising a normal stream and a companion stream. Control circuitry 502 may receive the video from a content server, an edge server, or directly from the encoder. The normal stream is a high-resolution video stream containing I-frames and P-frames arranged in long GOPs. For example, the GOP length in the normal stream may correspond to ten seconds of content. The companion stream contains frames at a lower resolution. Each frame in the companion stream depicts the same image and a corresponding frame in the normal stream. However, the companion stream may only contain one frame for every half-second of content. These frames may be encoded as I-frames.

At 704, control circuitry 502 outputs the video by decoding frames from the normal stream. Control circuitry 502 decodes an I-frame from the normal stream and outputs the resulting image. Control circuitry 502 may also store a copy of the decoded frame in a reference picture buffer. Control circuitry 502 may use the stored frame as a reference for decoding subsequent frames.

At 706, control circuitry 502 periodically simulates low-resolution frame injection to the reference picture buffer using a decoded frame from the normal stream. For example, after decoding a frame from the normal stream, control circuitry 502 may, in addition to outputting the image from the decoded frame, downscale the decoded frame to the lower resolution of the companion frame, upscale the downscaled frame back to its original resolution, and store the upscaled frame in the reference picture buffer.

At 708, control circuitry 502 determines whether the integrity of the stream has been compromised. For example, control circuitry 502 may monitor network conditions and/or data packets received from the streaming source. Control circuitry 502 may detect a drop in network bandwidth or connectivity that impacts the stream. Control circuitry 502 may, alternatively or additionally, detect that a packet was dropped from the stream. If stream integrity has not been compromised ("No" at 708), then processing returns to 704 and control circuitry 502 continues to decode and output frames from the normal stream.

If the stream integrity has been compromised in any way ("Yes" at 708), then, at 710, control circuitry 502 decodes a frame from the companion stream. Control circuitry 502 may access the nearest frame in the companion stream to the current frame in the normal stream. At 712, control circuitry 502 upscales the frame to match the resolution of the normal stream. This may be accomplished using reference picture resampling, as described above. At 714, control circuitry 502 injects the upscaled frame into the reference picture buffer. At 716, control circuitry 502 decodes the next frame from the normal stream with reference to the upscaled frame from the reference picture buffer. The decoder thus has a reference picture from which to decode a frame from the normal stream even if a frame was lost.

The actions and descriptions of FIG. 7 may be used in any other embodiment of this disclosure. In addition, the actions and descriptions described in relation to FIG. 7 may be done in suitable alternative orders or in parallel to further the purposes of this disclosure.

The processes described above are intended to be illustrative and not limiting. One skilled in the art would appreciate that the steps of the processes described herein may be omitted, modified, combined, and/or rearranged, and any additional steps may be performed without departing from the scope of this disclosure. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should be noted that the systems and/or methods described above may be applied to, or used in accordance with, other systems and/or methods.

What is claimed is:

1. A method for fast resolution recovery of a video stream, the method comprising:

receiving a source video;

encoding the source video in a video streaming protocol comprising a normal stream and a companion stream, wherein the normal stream contains I-frames and predicted frames at a first resolution and the companion stream contains frames at a second resolution lower than the first resolution, wherein I-frames in the normal stream are encoded at a first interval corresponding to a first amount of time, and wherein I-frames from the companion stream may be decoded and upscaled from the second resolution to the first resolution and injected into a decoded picture buffer by a decoder if needed; and at a second interval corresponding to a second amount of time that is shorter than the first amount of time:

encoding a first frame;

generating a downscaled frame by downscaling the first frame from the first resolution to the second resolution;

generating an upscaled frame by upscaling the downscaled frame from the second resolution to the first resolution; and encoding a second frame with reference to the upscaled frame such that, after injection of an upscaled I-frame from the companion stream into the decoded picture buffer, an output stream resolution recovers to the first resolution based on the second frame prior to receipt of a next I-frame in the normal stream, wherein:

the second frame immediately follows the first frame in an encoding order;

the upscaled I-frame is injected into the decoded picture buffer in place of a corresponding frame from the normal stream; and the upscaled I-frame has been decoded and upscaled from the second resolution to the first resolution and represents a same picture content as the corresponding frame from the normal stream.

2. The method of claim 1, wherein the first frame is a P-frame.

3. The method of claim 1, wherein the first frame is a B-frame.

4. The method of claim 1, wherein the first frame is an I-frame.

5. The method of claim 1, wherein upscaling the downscaled frame from the second resolution to the first resolution comprises performing reference picture resampling on the downscaled frame.

6. The method of claim 1, wherein the companion stream contains only I-frames at the second resolution.

7. A system for fast resolution recovery of a video stream, the system comprising:
  input/output circuitry configured to receive a source video; and
  control circuitry configured to:
    encode the source video in a video streaming protocol comprising a normal stream and a companion stream, wherein the normal stream contains I-frames and predicted frames at a first resolution and the companion stream contains frames at a second resolution lower than the first resolution, wherein I-frames in the normal stream are encoded at a first interval corresponding to a first amount of time, and wherein I-frames from the companion stream may be decoded and upscaled from the second resolution to the first resolution and injected into a decoded picture buffer by a decoder if needed; and
    at a second interval corresponding to a second amount of time that is shorter than the first amount of time:
      encode a first frame;
      generate a downscaled frame by downscaling the first frame from the first resolution to the second resolution;
      generate an upscaled frame by upscaling the downscaled frame from the second resolution to the first resolution; and
      encode a second frame with reference to the upscaled frame such that, after injection of an upscaled I-frame from the companion stream into the decoded picture buffer, an output stream resolution recovers to the first resolution based on the second frame prior to receipt of a next I-frame in the normal stream, wherein:
        the second frame immediately follows the first frame in an encoding order;
        the upscaled I-frame is injected into the decoded picture buffer in place of a corresponding frame from the normal stream; and
        the upscaled I-frame has been decoded and upscaled from the second resolution to the first resolution and represents a same picture content as the corresponding from the normal stream.

8. The system of claim 7, wherein the first frame is a P-frame.

9. The system of claim 7, wherein the first frame is a B-frame.

10. The system of claim 7, wherein the first frame is an I-frame.

11. The system of claim 7, wherein the control circuitry configured to upscale the downscaled frame from the second resolution to the first resolution is further configured to perform reference picture resampling on the downscaled frame.

12. The system of claim 7, wherein the companion stream contains only I-frames at the second resolution.

13. A non-transitory, computer-readable medium having non-transitory computer-readable instructions encoded thereon for fast resolution recovery of a video stream that, when executed by control circuitry, cause the control circuitry to:
  receive a source video;
  encode the source video in a video streaming protocol comprising a normal stream and a companion stream, wherein the normal stream contains I-frames and predicted frames at a first resolution and the companion stream contains frames at a second resolution lower than the first resolution, wherein I-frames in the normal stream are encoded at a first interval corresponding to a first amount of time, and wherein I-frames from the companion stream may be decoded and upscaled from the second resolution to the first resolution and injected into a decoded picture buffer by a decoder if needed; and
  at a second interval corresponding to a second amount of time that is shorter than the first amount of time:
    encode a first frame;
    generate a downscaled frame by downscaling the first frame from the first resolution to the second resolution;
    generate an upscaled frame by upscaling the downscaled frame from the second resolution to the first resolution; and
    encode a second frame with reference to the upscaled frame such that, after injection of an upscaled I-frame from the companion stream into the decoded picture buffer, an output stream resolution recovers to the first resolution based on the second frame prior to receipt of a next I-frame in the normal stream, wherein:
      the second frame immediately follows the first frame in an encoding order;
      the upscaled I-frame is injected into the decoded picture buffer in place of a corresponding frame from the normal stream; and
      the upscaled I-frame has been decoded and upscaled from the second resolution to the first resolution and represents a same picture content as the corresponding frame from the normal stream.

14. The non-transitory, computer-readable medium of claim 13, wherein the first frame is a P-frame.

15. The non-transitory, computer-readable medium of claim 13, wherein the first frame is a B-frame.

16. The non-transitory, computer-readable medium of claim 13, wherein the first frame is an I-frame.

17. The non-transitory, computer-readable medium of claim 13, wherein execution of the instruction to upscale the downscaled frame from the second resolution to the first resolution further causes the control circuitry to perform reference picture resampling on the downscaled frame.

18. The non-transitory, computer-readable medium of claim 13, wherein the companion stream contains only I-frames at the second resolution.

* * * * *